(12) United States Patent
Hofstee et al.

(10) Patent No.: US 6,820,142 B2
(45) Date of Patent: Nov. 16, 2004

(54) TOKEN BASED DMA

(75) Inventors: Harm Peter Hofstee, Austin, TX (US); Ravi Nair, Briarcliff Manor, NY (US); John-David Wellman, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 09/736,356

(22) Filed: Dec. 14, 2000

(65) Prior Publication Data

US 2002/0078270 A1 Jun. 20, 2002

(51) Int. Cl.$^7$ .............................................. G06F 13/28
(52) U.S. Cl. .............................. 710/25; 710/23; 710/28
(58) Field of Search ............................. 710/23, 28, 22; 711/5, 147–152, 163; 370/230, 395.42, 369, 375–379; 345/560; 709/230

(56) References Cited

U.S. PATENT DOCUMENTS

| | | | | |
|---|---|---|---|---|
| 4,658,247 A | * | 4/1987 | Gharacharloo | 345/560 |
| 5,068,849 A | * | 11/1991 | Tanaka | 370/509 |
| 5,734,926 A | * | 3/1998 | Feeley et al. | 710/28 |
| 6,011,798 A | * | 1/2000 | McAlpine | 370/395.42 |
| 6,026,443 A | * | 2/2000 | Oskouy et al. | 709/230 |
| 6,029,225 A | * | 2/2000 | McGehearty et al. | 711/5 |
| 6,070,194 A | * | 5/2000 | Yu et al. | 710/28 |
| 6,275,877 B1 | * | 8/2001 | Duda | 710/23 |
| 6,393,512 B1 | * | 5/2002 | Chen et al. | 711/5 |

* cited by examiner

Primary Examiner—Jeffrey Gaffin
Assistant Examiner—Joshua D Schneider
(74) Attorney, Agent, or Firm—Robert A. Voigt, Jr.; Winstead Sechrest & Minick P.C.; Casimer K. Salys

(57) ABSTRACT

A method and system for accessing a shared memory in a deterministic schedule. In one embodiment, a system comprises a plurality of processing elements and a system I/O controller where each processing element and system I/O controller comprises a DMA controller. The system further comprises a shared memory coupled to each of the plurality of processing elements where the shared memory comprises a master controller. The master controller may then issue tokens to DMA controllers to grant the right for the associated processing elements and system I/O controller to access the shared memory at deterministic points in time. Each token issued by the master controller grants access to the shared memory for a particular duration of time at a unique deterministic point in time. A processing element or system I/O controller may access the shared memory upon the associated DMA controller relinquishing to the master controller the token that grants the right to access the shared memory at that particular time. The master controller may then reissue the relinquished token back to the DMA controller associated with the processing element or system I/O controller that accessed the shared memory if at a future designated time, e.g., 128 ns from the completion of the access to the shared memory, there does not exist a higher prioritized request, e.g., refresh the shared memory, to access the shared memory at that future designated time. The reissued token grants the right to access the shared memory at the future designated time.

20 Claims, 5 Drawing Sheets

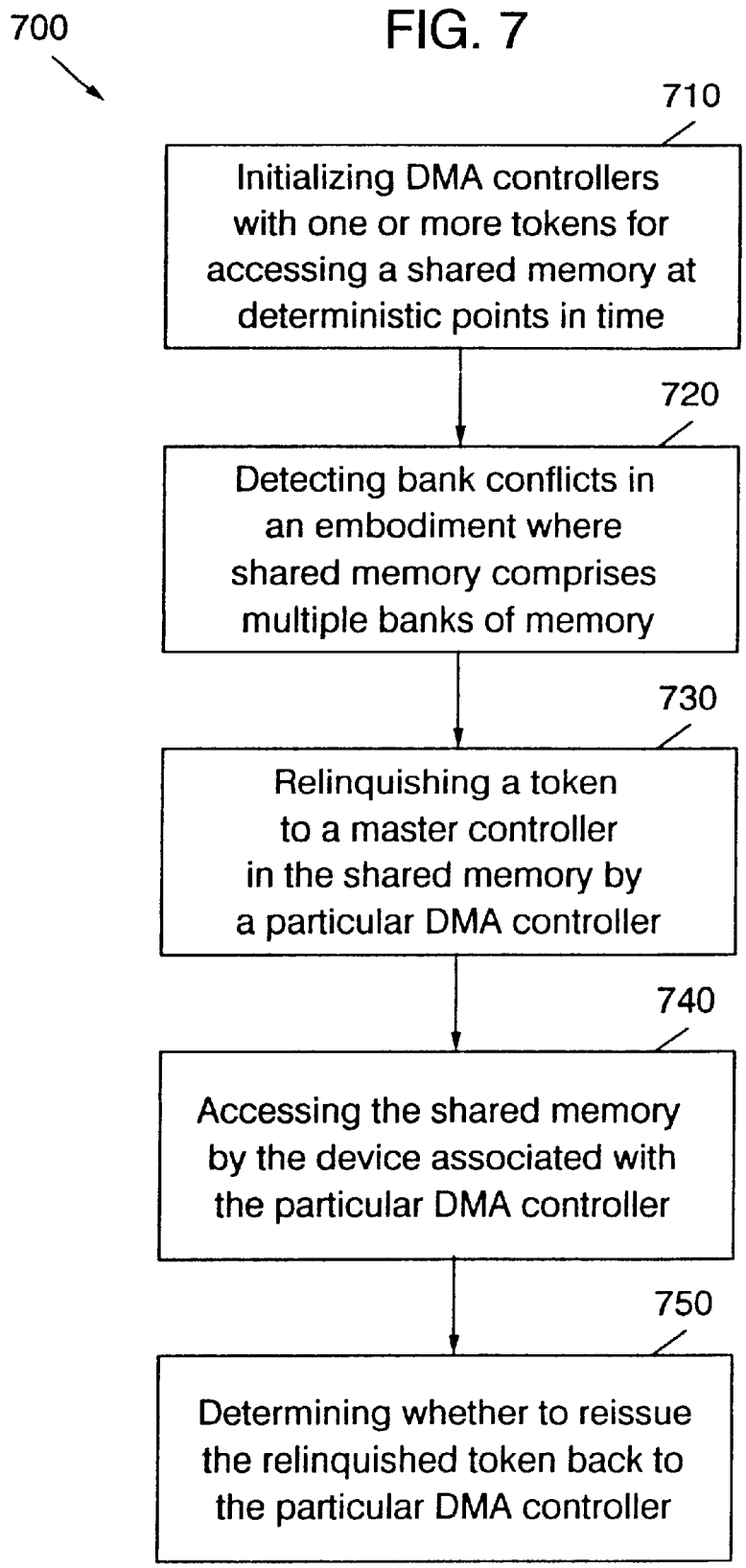

TOKEN BASED DMA

CROSS REFERENCE TO RELATED APPLICATIONS

The present invention is related to the following U.S. patent applications which are incorporated herein by reference:

Ser. No. 09/736,452 entitled "Reduction of Interrupts in Remote Procedure Calls" filed Dec. 14, 2000.

Ser. No. 09/736,585 entitled "Symmetric Multi-Processing System" filed Dec. 14, 2000.

TECHNICAL FIELD

The present invention relates to the field of Direct Memory Access (DMA) transactions, and more particularly to a deterministic schedule for DMA accesses via tokens.

BACKGROUND INFORMATION

One widely accepted system architecture for computing systems has been the Symmetric Multi-Processing (SMP) architecture. Symmetric Multi-Processing (SMP) computer architectures are known in the art as overcoming the limitations of single or uniprocessors in terms of processing speed and transaction throughput, among other things. Typically, commercially available SMP systems are generally "shared memory" systems, characterized in that multiple processing elements on a bus, or a plurality of busses, share a single global memory. In an SMP system, all memory is uniformly accessible to each processing element, which simplifies the task of dynamic load distribution. Processing of complex tasks can be distributed among various processing elements in the multiprocessing element system while data used in the processing is substantially equally available to each of the processing elements undertaking any portion of the complex task. Similarly, programmers writing code for typical shared memory SMP systems do not need to be concerned with issues of data partitioning, as each of the processing elements has access to and shares the same, consistent global memory.

Each processing element in the SMP computer architecture may comprise a Direct Memory Access (DMA) controller. The DMA controller handles DMA transactions between the shared system memory and the corresponding processing element in the multiprocessing element system. That is, the DMA controller allows blocks of information to be exchanged between the corresponding processing element in the multiprocessing element system and the shared system memory. Typically, the processing elements in the multiprocessing element system may initiate a DMA transfer by having the respective DMA controller issue a DMA request to the shared system memory. The shared system memory typically comprises an arbitration mechanism to arbitrate among the DMA requests issued by the processing elements in the multiprocessing element system. Once the arbitration mechanism determines which DMA channel, i.e., channel coupling the DMA controller and the shared system memory, is to be serviced, the particular processing element associated with that DMA channel gains access, commonly referred to as a DMA access, to the system memory to initiate the DMA transfer.

Unfortunately, an arbitration mechanism is required to arbitrate among the DMA requests issued by the DMA controllers of the processing elements in the multiprocessing element system.

It would therefore be desirable to develop an SMP architecture that eliminates the necessity of an arbitration mechanism to arbitrate among the DMA requests issued by the DMA controllers of the processing elements in the SMP system. It would further be desirable to develop a deterministic schedule for DMA accesses via the issuance of tokens and hence improve utilization of the data transfer bus.

SUMMARY

The problems outlined above may at least in part be solved in some embodiments by a master controller in a shared memory configured to issue and receive tokens that grant the right to access the shared memory at a particular deterministic point in time for a selected duration of time, e.g., clock cycle. Master controller may be configured to issue tokens to Direct Memory Access (DMA) controllers of processing elements and a system I/O controller in a Symmetric Multi-Processing (SMP) system. Each token may be unique by granting the processing element or system I/O controller whose DMA controller possesses the respective token the right to access the shared memory at a unique designated time and lasting a designated duration of time. By master controller allocating unique tokens among DMA controllers, a deterministic schedule to access the shared memory may be achieved without the arbitration mechanism of the prior art.

In one embodiment, a system for accessing shared memory comprises a plurality of processing elements where each processing element comprises a DMA controller. The system further comprises a shared memory coupled to each of the plurality of processing elements where the shared memory comprises a master controller. The master controller may then issue tokens to DMA controllers to grant the right for the associated processing elements to access the shared memory at deterministic points in time. Each token issued by the master controller grants access to the shared memory for a particular duration of time at a unique deterministic point in time. A processing element may access the shared memory upon the associated DMA controller relinquishing to the master controller the token that grants the right to access the shared memory at that particular time. The master controller may then reissue the relinquished token back to the DMA controller associated with the processing element that accessed the shared memory if at the future designated time, e.g., 128 ns from the completion of the access to the shared memory, there does not exist a higher prioritized request, e.g., refresh the shared memory, to access the shared memory at that future designated time. The reissued token grants the right to the processing element associated with the DMA controller to access the shared memory at the future designated time, e.g., 128 ns from the completion of the access to the shared memory by the processing element. However, if there exists a higher prioritized request at the future designated time, then the master controller may not reissue the relinquished token back to the DMA controller associated with the processing element that accessed the shared memory.

In another embodiment of the present invention, the shared memory may comprise a plurality of memory banks resulting in the possibility of a bank conflict. A bank conflict may occur when the DMA controller requests to read from or write to a particular memory bank more than once during the designated period of time of the access to the shared memory. DMA controllers may comprise a queue comprising a plurality of memory line addresses to be accessed by the associated processing element during the designated period of time. A portion of the memory line addresses may comprise one or more bits that indicate a particular memory bank that includes a line of a page associated with the memory line address. DMA controllers may further comprise a detector to detect a bank conflict by examining the memory bank indicator portion of the memory line addresses to determine if there exists a bank conflict. A bank conflict may be detected by the detector by detecting two or more memory addresses with the same memory bank indicator. The detector of the DMA controllers may be configured to resolve the bank conflicts by not issuing two or more requests to read from or write to the same memory bank during the designated period of access.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 7 is a flowchart of a method for accessing a shared memory in a deterministic schedule.

DETAILED DESCRIPTION

The present invention comprises a method and system for accessing a shared memory in a deterministic schedule. In one embodiment of the present invention, a system for accessing a shared memory in a deterministic schedule comprises a plurality of processing elements and a system Input/Output (I/O) controller where each processing element and system I/O controller comprises a DMA controller. The system further comprises a shared memory coupled to each of the plurality of processing elements and system I/O controller where the shared memory comprises a master controller. The master controller may then issue tokens to DMA controllers to grant the right for the associated processing elements and system I/O controller to access the shared memory at deterministic points in time. Each token issued by the master controller grants access to the shared memory for a particular duration of time at a unique deterministic point in time. A processing element or system I/O controller may access the shared memory upon the associated DMA controller relinquishing to the master controller the token that grants the right to access the shared memory at that particular time. The master controller may then reissue the relinquished token back to the DMA controller associated with the processing element or system I/O controller that accessed the shared memory if at a future designated time, e.g., 128 ns from the completion of the access to the shared memory, there does not exist a higher prioritized request, e.g., refresh the shared memory, to access the shared memory at that future designated time. The reissued token grants the right to the processing element or system I/O controller associated with the DMA controller to access the shared memory at the future designated time, e.g., 128 ns from the completion of the access to the shared memory. However, if there exists a higher prioritized request at the future designated time, then master controller may not reissue the relinquished token back to the DMA controller associated with the processing element or system I/O controller that accessed the shared memory.

Figure 1:
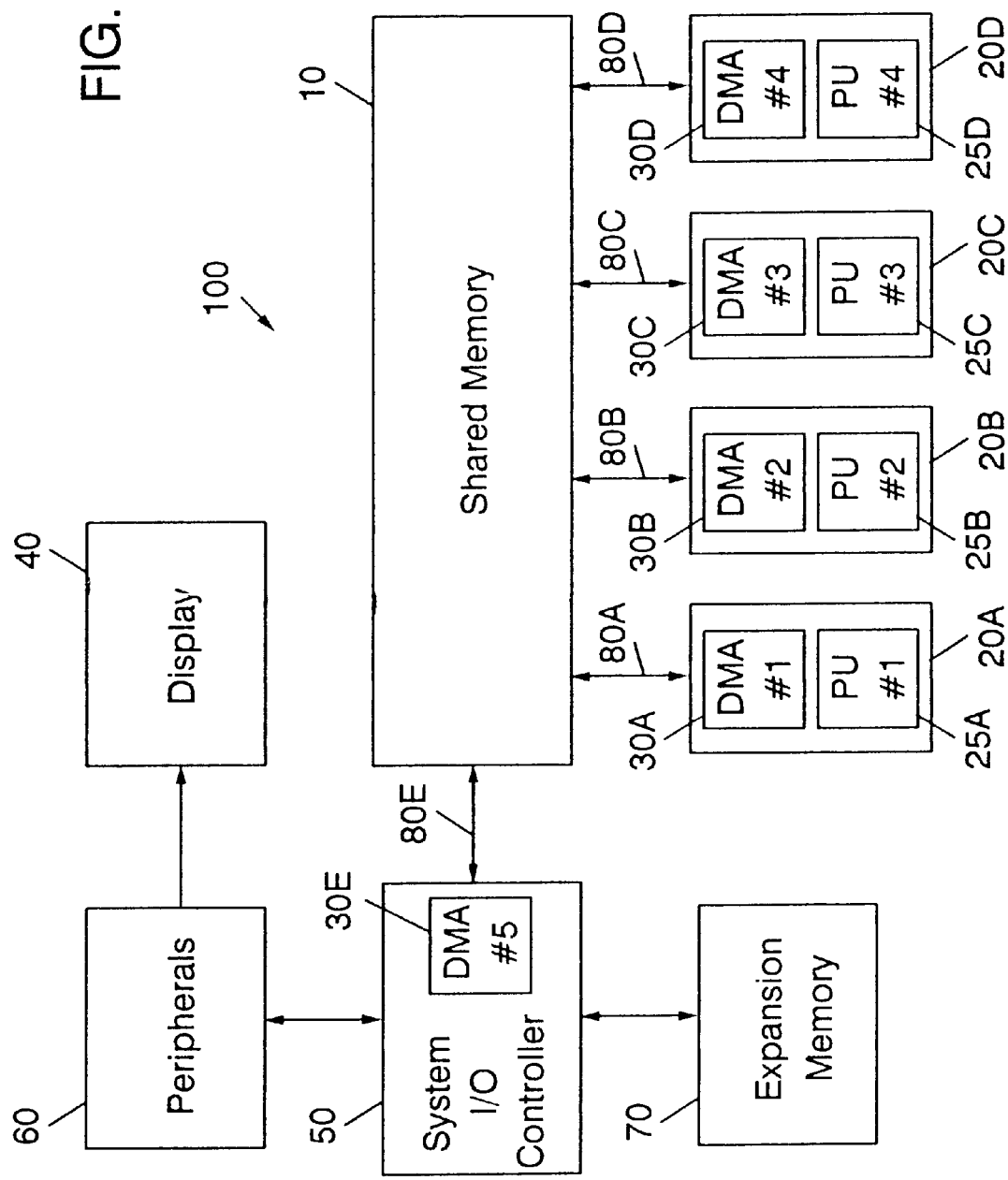
FIG. 1 illustrates a symmetric multi-processing system in accordance with the present invention.

FIG. 1—Symmetric Multiprocessing System

FIG. 1 illustrates an embodiment of the present invention of a Symmetric Multi-Processing system (SMP) 100. Symmetric Multi-Processing system 100 comprises a shared memory 10, e.g., Dynamic Random Access Memory (DRAM), Static RAM (SRAM), coupled to a plurality of processing elements 20 A–D. Processing elements 20 A–D may collectively or individually be referred to as processing elements 20 or processing element 20, respectively. Shared memory 10 may be further coupled to a system Input/Output (I/O ) controller 50. System I/O Controller 50 may be coupled to one or more peripheral devices 60, e.g., SCSI host bus adapter, LAN adapter, graphics adapter, audio peripheral device, which may be coupled to a display 40. System I/O Controller 50 may further be coupled to expansion memory 70. Expansion memory 70 may be configured to provide a fast file system. It is noted that system 100 may comprise any number of processing elements 20 and peripheral devices 60 and that FIG. 1 is used for illustrative purposes.

Processing elements 20A–D may comprise processing units 25A–D, e.g., PowerPC™, and Direct Memory Address (DMA) controllers 30A–D, respectively. Furthermore, system I/O controller 50 may comprise DMA controller 30E. Processing units 25A–D may collectively or individually be referred to as processing units 25 or processing unit 25, respectively. DMA controllers 30A-E may collectively or individually be referred to as DMA controllers 30 or DMA controller 30, respectively. As stated in the Background Information section, DMA controllers 30 may handle DMA transactions between shared memory 10 and processing elements 20 as well as between shared memory 10 and system I/O controller 50. That is, DMA controllers 30 allow blocks of information to be exchanged between processing elements 20A–D and shared memory 10 and between system I/O controller 50 and shared memory 10. The connections between shared memory 10 and DMA controllers 30A–E are referred to as DMA channels 80A–E. DMA channels 80A–E may collectively or individually be referred to as DMA channels 80 or DMA channel 80, respectively.

Figure 2:
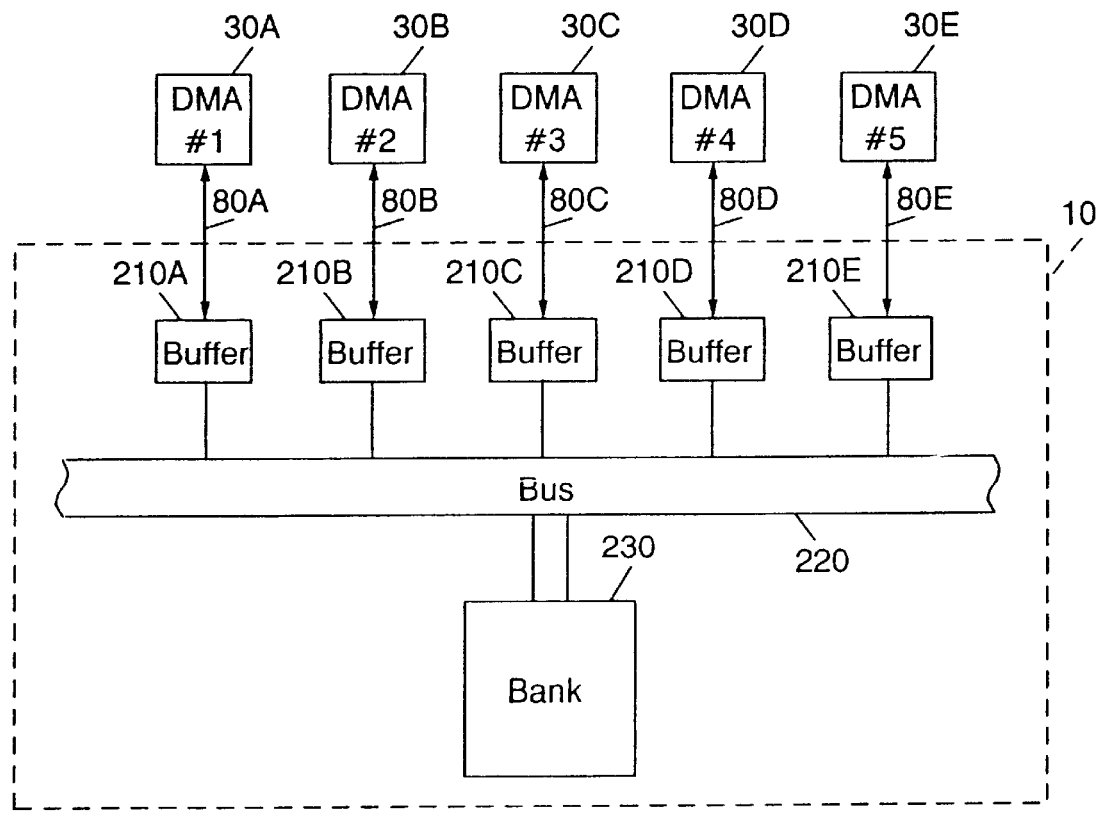
FIG. 2 illustrates an embodiment of a shared memory with one bank configured in accordance with the present invention.

FIG. 2—Shared Memory With One Bank

FIG. 2 illustrates an embodiment of the present invention of shared memory 10, e.g., DRAM, SDRAM. In one embodiment, shared memory 10 may reside on an integrated circuit. Shared memory 10 may comprise a bus 220 coupled to a plurality of buffers 210A–E as well as a bank of memory 230. Shared memory 10 may be coupled to DMA controllers 30A–E through DMA channels 80A–E. Buffers 210A–E may collectively or individually be referred to as buffers 210 or buffer 210, respectively. In one embodiment, each buffer 210 may be coupled to a unique DMA controller 30 as illustrated in FIG. 2. It is noted that since system 100 may comprise any number of processing elements 20 and hence any number of DMA controllers 30 that shared memory 10 may comprise any number of buffers 210.

In one embodiment, buffers 210 may be configured to temporarily store data read from bank 230 by processing elements 20 or system I/O controller 50 or data to be written to bank 230 by processing elements 20 or system I/O controller 50.

Figure 3:
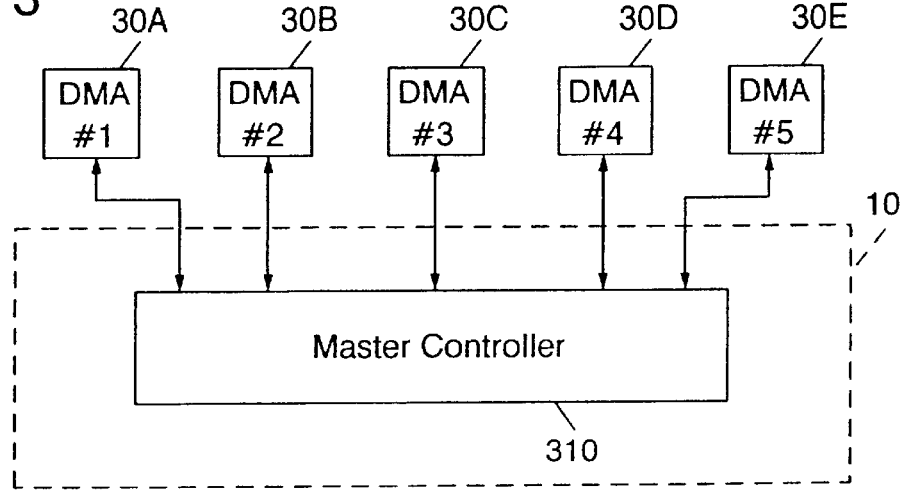
FIG. 3 illustrates an embodiment of the present invention of a master controller of a shared memory configured to issue and receive tokens to and from DMA controllers.

FIG. 3—Master Controller of Shared Memory

FIG. 3 illustrates an embodiment of the present invention of a master controller 310 in shared memory 10 that is configured to issue and receive tokens, i.e., credits, to and from DMA controllers 30. As stated in the Background Information section, prior art SMP systems require an arbiter to arbitrate among the DMA requests issued by DMA controllers 30 of processing elements 20 in the multiprocessing element system. It would therefore be desirable to develop an SMP architecture that eliminates the necessity of an arbitration mechanism to arbitrate among the DMA requests issued by DMA controllers 30 in the multiprocessing element system. A deterministic schedule for DMA accesses without the arbitration mechanism may be accomplished through the use of tokens, i.e., credits, as will further be described below.

Figure 5:
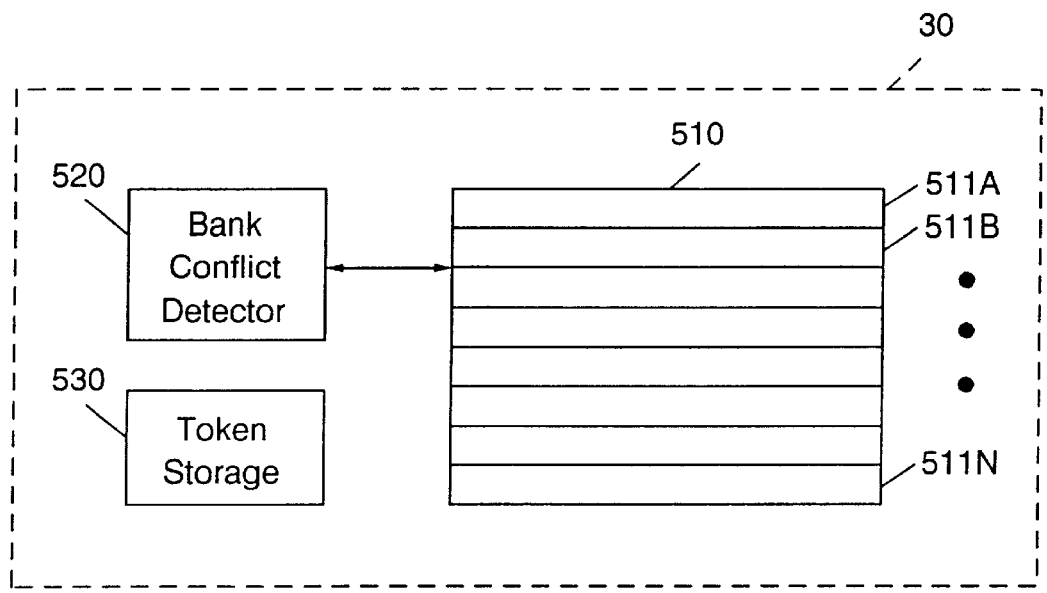
FIG. 5 illustrates an embodiment of a DMA controller configured in accordance with the present invention.

As stated above, master controller 310 may be configured to issue and receive tokens, i.e., credits, to and from DMA controllers 30. In one embodiment, token(s) received by DMA controllers 30 are stored in a queue, e.g., token storage 530, as illustrated in FIG. 5. FIG. 5 illustrates a DMA controller 30 in additional detail and will be discussed further below. Returning to FIG. 3, in conjunction with FIG. 1, tokens are distributed by master controller 310 to DMA controllers 30 to grant the associated processing elements 20 and system I/O controller 50 the right to access shared memory 10 for a particular selected duration of time, e.g., 4 ns, such as a clock cycle, starting at different points in time in the future. That is, each token may be unique by allowing processing element 20 or system I/O controller 50 whose DMA controller 30 possesses the respective token in queue to grant the right to access shared memory 10 at a unique time in the future lasting the designated duration of time, e.g., 4 ns. Processing element 20 or system I/O controller 50 may access shared memory 10 at a particular time by having the associated DMA controller 30 relinquish the token associated with that particular time to master controller 310. Master controller 310 may reissue the token received back to DMA controller 30 associated with a different future designated time. For example, if master controller 310 maintains 32 tokens and each token grants the right to access shared memory 10 for 4 ns, then when master controller 310 receives a token from DMA controller 30, master controller 310 may reissue the relinquished token back to DMA controller 30 granting the right to access shared memory 10 for a designated period of time, e.g., 4 ns, at a future designated time, e.g., 128 ns from that point in time. In one embodiment, the future designated time may be calculated by multiplying the designated period of access with the number of tokens maintained by master controller 310. For example, if the designated period of access is 4 ns and the number of tokens maintained by master controller 310 is 32, then master controller 310 may reissue a relinquished token back to DMA controller 30 to grant the associated processing element 20 the right to access shared memory 10 for a designated period of time, e.g., 4 ns, starting at 128 ns in the future (4 ns times 32). By master controller 310 allocating unique tokens among DMA controllers 30, a deterministic schedule to access shared memory 10 may be achieved without the arbitration mechanism in prior art.

Master controller 310 may not reissue a relinquished token back to DMA controller 30 if at that future designated time, e.g., 128 ns, there exists a higher prioritized request, e.g., refresh shared memory 10, higher priority I/O request from DMA controller 30E of system I/O controller 50, to access shared memory 10 at that future designated time, e.g., 128 ns. Master controller 310 may instead issue the relinquished token to another DMA controller 30, e.g., DMA controller 30E of system I/O controller 50 for issuing a higher priority request, or withhold distribution for refreshing shared memory 10. For example, upon completion of the access to shared memory 10 by processing element 20, master controller 310 may not reissue the token back to DMA controller 30 of processing element 20 to grant the right to access shared memory 10 at a future designated time, e.g., 128 ns from the completion of the access to shared memory 10 by processing element 20, if DMA controller 30E of system I/O controller 50 requests access to shared memory 10 at that particular future designated time. Master controller 310 may then issue the relinquished token to the DMA controller 30E of system I/O controller 50 for issuing a higher priority request. It is noted that master controller 310 may be configured to implement a priority scheme whereby requests from DMA controller 30E of system I/O controller 50 receive a higher priority than requests from DMA controllers 30A–D of processing elements 20. It is further noted that master controller 310 may be configured to implement any type of priority scheme. In one embodiment, if master controller 310 did not reissue a relinquished token back to DMA controller 30, then master controller 310 upon completion of the designated period of time, e.g., 4 ns, at the future designated time, e.g., 128 ns, associated with the token not reissued may reissue that token back to DMA controller 30 where the token grants the associated processing element 20 or system I/O controller 50 the right to access shared memory 10 for a designated period of time, e.g., 4 ns, starting at a new future designated time, e.g., 128 ns from the completion of accessing shared memory 10 by the higher prioritized request.

Figure 4:
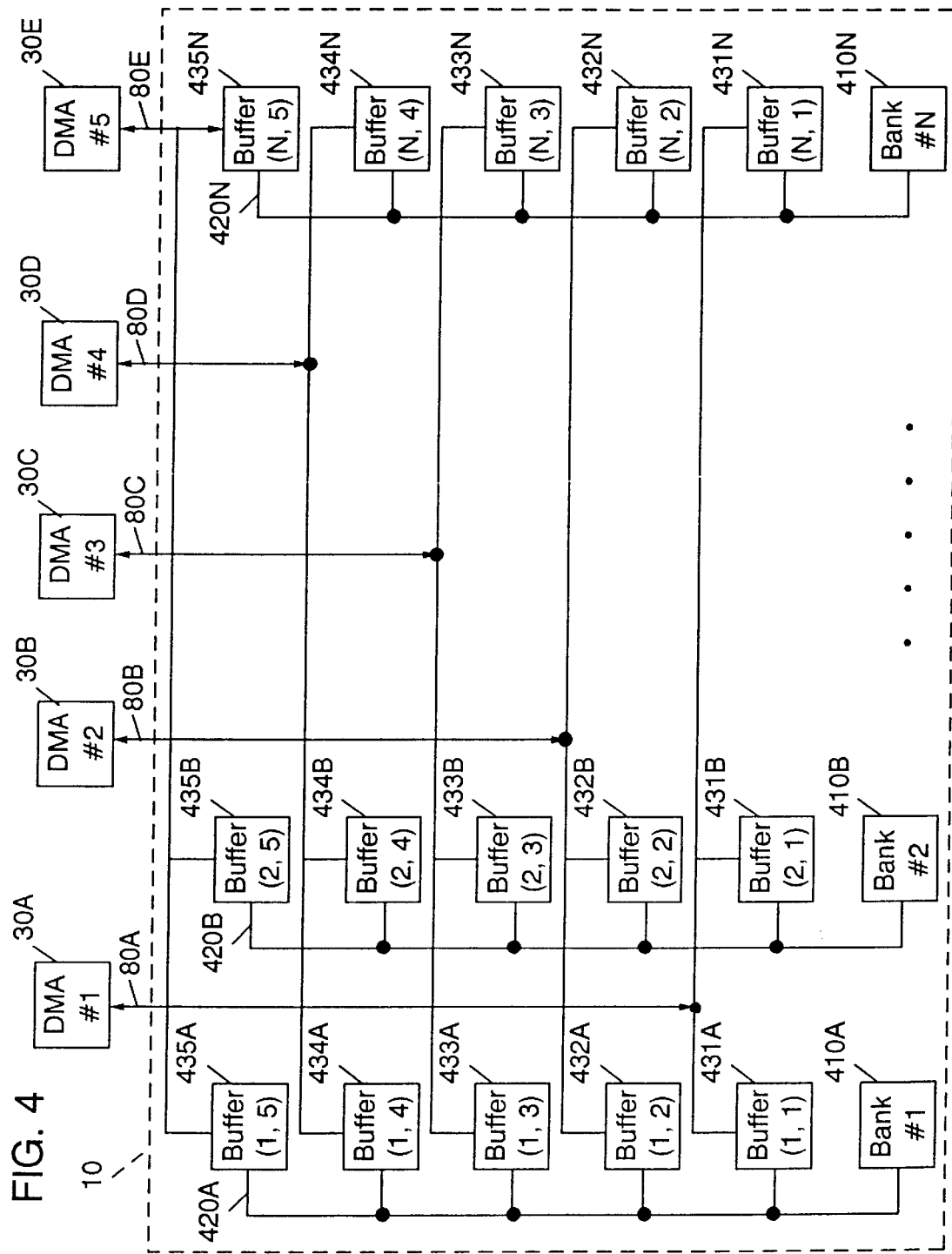
FIG. 4 illustrates an embodiment of a shared memory with a plurality of memory banks configured in accordance with the present invention.

FIG. 4—Multi-Bank Shared Memory

FIG. 4 illustrates an embodiment of the present invention of a shared memory 10 comprising multiple banks of memory. Shared memory 10 of FIG. 4 differs from shared memory 10 of FIG. 2 by comprising a plurality of memory banks 410A–N instead of one memory bank 230 and a plurality of busses 420A–N instead of one bus 220. Furthermore, shared memory 10 comprises a plurality of buffers 431–435(A–N) associated with memory banks 410A–N and busses 420A–N. Shared memory 10 of FIG. 4 may reside on an integrated circuit. Memory banks 410A–N may collectively or individually be referred to as memory banks 410 or memory bank 410, respectively. Busses 420A–N may collectively or individually be referred to as busses 420 or bus 420, respectively.

Referring to FIG. 4, each memory bank 410, e.g., memory bank 410A, has a particular bus 420, e.g., bus 420A, and a plurality of buffers, e.g., buffers 431–435A, associated with it. The number of buffers, e.g., buffers 431–435A, associated with the particular memory bank 410, e.g., memory bank 410A, correspond to the same number of DMA controllers 30. For example, FIG. 4 illustrates DMA controllers 30A–E coupled to shared memory 10 through DMA channels 80A–E. Since there are five DMA controllers 30A–E, then there are five buffers, e.g., buffers 431–435A, associated with each memory bank 410, e.g., memory bank 410A. Furthermore, each memory bank 410, e.g., memory bank 410A, has a bus 420, e.g., bus 420A, coupled to the plurality of buffers, e.g., buffers 431–435A, associated with the particular memory bank, e.g., memory bank 410A. The buffers, e.g., buffers 431–435A, associated with the particular memory bank 410, e.g., memory bank 410A, may then be configured to temporarily store data read from that particular memory bank 410, e.g., memory bank 410A, or data to be written to that particular memory bank 410, e.g., memory bank 410A, through bus 420, e.g., bus 420A. Memory bank 410B has bus 420B and buffers 431–435B associated with it. Memory bank 410N has bus 420N and buffers 431–435N associated with it. It is noted that shared memory 10 may comprise any number of memory banks 410 and therefore shared memory 10 may comprise any number of busses 420. It is further noted that since system 100 may comprise any number of processing elements 20 and hence any number of DMA controllers 30 that shared memory 10 may comprise any number of buffers, e.g., buffers 431–435A, associated with each particular memory bank 410, e.g., memory bank 410A.

As stated above, each particular buffer, e.g.,buffer 431A, may temporarily store data read from a particular memory bank 410, e.g., memory bank 410A, by a particular processing element 20, e.g., processing element 20A, or system I/O controller 50 or data to be written to a particular memory bank 410, e.g., memory bank 410A, by a particular processing element 20, e.g., processing element 20A, or system I/O controller 50. For example, buffers 431A–N may temporarily store data read from memory banks 410A–N, respectively, by processing element 20A or data to be written to memory banks 410A–N, respectively, by processing element 20A. Buffers 432A–N may temporarily store data read from memory banks 410A–N, respectively, by processing element 20B or data to be written to memory banks 410A–N, respectively, by processing element 20B. Buffers 433A–N may temporarily store data read from memory banks 410A–N, respectively, by processing element 20C or data to be written to memory banks 410A–N, respectively, by processing element 20C. Buffers 434A–N may temporarily store data read from memory banks 410A–N, respectively, by processing element 20D or data to be written to memory banks 410A–N, respectively, by processing element 20D. Buffers 435A–N may temporarily store data read from memory banks 410A–N, respectively, by processing element system I/O controller 50 or data to be written to memory banks 410A–N, respectively, by system I/O controller 50.

As stated above, a token may grant an associated processing element 20 or system I/O controller 50 the right to access shared memory 10 for a particular selected duration of time, e.g., 4 ns, such as a clock cycle, starting at a unique particular time in the future. The associated processing element 20 or system I/O controller 50 may request to read from or write to a page in shared memory 10 for the duration of time, e.g., 4 ns, at the unique particular time in the future. A page may refer to a section of memory, e.g., 4 kilobytes of memory. The page may comprise either a contiguous or non-contiguous section of memory. A page may comprise a contiguous section of memory when shared memory 10 comprises a single bank 230 of memory as in FIG. 2. A page may comprise a non-contiguous section of memory when shared memory 10 comprises a plurality of memory banks 410 as illustrated in FIG. 4. In a non-contiguous section of memory, a page may be described as comprising a plurality of lines of memory. For example, a 4 kilobyte page may comprise 32 lines where each line comprises 128 bytes of memory. In one embodiment, every line of the page may reside in a different memory bank 410. Hence, if there are 32 lines that comprise a page, shared memory may comprise 32 banks 410 of memory. It is noted that each line of a page across a plurality of memory banks 410 may be accessed simultaneously.

When processing element 20 or system I/O controller 50 acquires the right to access shared memory 10 via a token, processing element 20 or system I/O controller 50 may request to read from or write to a page comprising a non-contiguous section of memory across a plurality of memory banks 410. If processing element 20 or system I/O controller 50 requests to read from or write to a particular memory bank 410 more than once during the designated period of time, e.g., 4 ns, then a bank conflict has occurred. That is, a bank conflict occurs when processing element 20 or system I/O controller 50 attempts to access data at a particular bank address more than once during the designated period of time, e.g., 4 ns. As stated above, each line of a page across a plurality of memory banks 410 may be accessed simultaneously. However, multiple lines in a particular memory bank 410 where the page comprises a non-contiguous section of memory may not be accessed simultaneously. Hence, the data in the multiple lines in the particular memory bank 410 of a page comprising a non-contiguous section of memory may not be accessed during the designated period of time, e.g., 4 ns. Therefore, it may be advantageous to detect and resolve a bank conflict prior to master controller 310 issuing and receiving tokens and thereby maintaining the deterministic schedule of DMA accesses. DMA controllers 30 may be configured to detect and resolve bank conflicts prior to master controller 310 issuing and receiving tokens as described below.

FIG. 5—DMA Controller

FIG. 5 illustrates a DMA controller 30 in accordance with the principles of the present invention. DMA controller 30 may comprise a token storage unit 530 configured to store token(s) received from master controller 310. DMA controller 30 may further comprise a queue 510 for storing a plurality of memory line addresses 511A–N to be accessed by the associated processing element 20 or system I/O controller 50 during the designated period of time, e.g., 4 ns. Memory line addresses 511A–N may collectively or individually be referred to as memory line addresses 511 or memory line address 511, respectively. It is noted that queue 510 may comprise any number of memory line addresses 511. In the preferred embodiment, queue 510 comprises at least the same number of memory line addresses 511 as the number of line addresses of a page comprising a non-contiguous section of memory. For example, if a page comprises 32 lines of non-contiguous memory, then in the preferred embodiment queue 510 comprises at least 32 memory line addresses where each memory line address is associated with one of the lines of the page.

Figure 6:
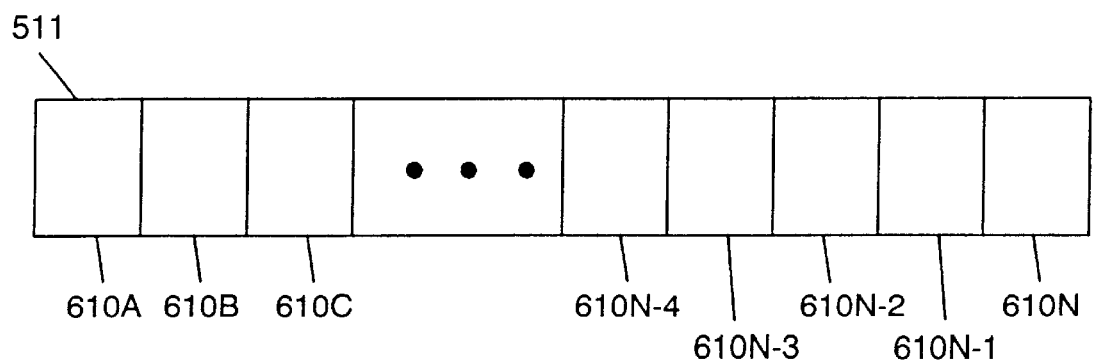
FIG. 6 illustrates an embodiment of a memory line address configured in accordance with the present invention.

DMA controller 30 may further comprise a bank conflict detector 520 configured to detect bank conflicts. In one embodiment, memory line addresses 511 may comprise a plurality of bits 610A–610N as illustrated in FIG. 6. It is noted that memory line addresses 511 may comprise any number of bits and that bits 610A–610N are used for illustrative purposes only. Referring to FIG. 6, a portion of memory line address 511, e.g., 610N-4, 610N-3, 610N-2, 610N-1, 610N, may be dedicated to indicate which particular memory bank 410 of shared memory 10 includes the line of the page associated with that particular memory line address 511. It is noted that the memory bank indicator portion indicating which particular memory bank 410 of shared memory 10 includes the line of the page associated with that particular memory line address 511 may be any number of bits. For example, if there are 32 memory banks 410 then the last five bits, e.g., 610N-4, 610N-3, 610N-2, 610N-1, 610N, of memory line address 511 may be dedicated to indicate which particular memory bank 410 of shared memory 10 includes the line of the page associated with that particular memory line address 511. It is noted that the portion of memory line address 511 indicating the particular memory bank 410 may be located anywhere in memory line address 511. As stated above, bank conflict detector 520 may be configured to detect bank conflicts. Bank conflict detector 520 detects bank conflicts by examining the memory bank indicator portion of memory line addresses 511 that indicates which particular memory bank 410 of shared memory 10 includes the line of the page associated with that particular memory line address 511. That is, bank conflict detector 520 detects a bank conflict by detecting two or more memory addresses 511 with the same memory bank indicator.

Bank conflict detector 520 may further be configured to resolve bank conflicts by not issuing two or more requests to read from or write to the same memory bank 410 during the designated period of access, e.g., 4 ns. In one embodiment, bank conflict detector 520 may be configured to implement a priority scheme among conflicting bank requests, i.e., bank conflicts, by requesting to read from or write to the memory bank 410 only once where that particular memory bank 410 has two or more requests to read from or write to multiple lines within that particular memory bank 410.

FIG. 7—Method for Accessing Shared Memory in a Deterministic Schedule

FIG. 7 illustrates a flowchart of one embodiment of the present invention of a method 700 for accessing shared memory 10 in a deterministic schedule. In step 710, DMA controllers 30 of processing elements 20 and system I/O controller 50 may be initialized with one or more tokens stored in a queue, e.g., token storage 530, for accessing shared memory 10 at a deterministic point in time. As stated above, tokens are distributed by master controller 310 to DMA controllers 30 to grant the associated processing elements 20 and system I/O controller 50 the right to access shared memory 10 for a particular selected duration of time, e.g., 4 ns, such as a clock cycle, starting at different deterministic points in time in the future. That is, each token may be unique by allowing processing element 20 or system I/O controller 50 whose DMA controller 30 possesses the respective token in queue, e.g., token storage 530, to grant the right to access shared memory 10 at a unique time in the future lasting the designated duration of time, e.g., 4 ns.

In an embodiment of a shared memory 10 comprising multiple banks of memory 410 as illustrated in FIG. 4, DMA controllers 30 may determine whether there are bank conflicts in step 720. Referring to FIG. 5, DMA controller 30 may comprise a queue 510 for storing a plurality of memory line addresses 511 to be accessed by the associated processing element 20 or system I/O controller 50 during the designated period of time, e.g., 4 ns. DMA controller 30 may further comprise a bank conflict detector 520 configured to detect and resolve bank conflicts. As illustrated in FIG. 6, memory line addresses 511 may comprise a plurality of bits 610A–610N. It is noted that memory line addresses 511 may comprise any number of bits and that bits 610A–610N are used for illustrative purposes only. Referring to FIG. 6, a portion of memory line address 511, e.g., 610N-4, 610N-3, 610N-2, 610N-1, 610N, may be dedicated to indicate which particular memory bank 410 of shared memory 10 includes the line of the page associated with that particular memory line address 511. It is noted that the memory bank indicator portion indicating which particular memory bank 410 of shared memory 10 includes the line of the page associated with that particular memory line address 511 may be any number of bits. As stated above, bank conflict detector 520 may be configured to detect and resolve bank conflicts. Bank conflict detector 520 detects bank conflicts by examining the memory bank indicator portion of memory line addresses 511 that indicates which particular memory bank 410 of shared memory 10 includes the line of the page associated with that particular memory line address 511. That is, bank conflict detector 520 detects a bank conflict by detecting two or more memory addresses 511 with the same memory bank indicator. Bank conflict detector 520 may be configured to resolve bank conflicts by not issuing two or more requests to read from or write to the same memory bank 410 for the designated period of access, e.g., 4 ns. In one embodiment, bank conflict detector 520 may be configured to implement a priority scheme among conflicting bank requests, i.e., bank conflicts, by requesting to read from or write to the memory bank 410 only once where that particular memory bank 410 has two or more requests to read from or write to multiple lines within that particular memory bank 410.

In step 730, DMA controller 30 may relinquish a token to master controller 310 to allow the associated processing element 20 or system I/O controller 50 to access shared memory 10 at the particular deterministic point in time associated with the token. In step 740, the processing element 20 or system I/O controller 50 associated with the token relinquished to master controller 310 accesses shared memory 10 during the designated period of time, e.g., 4 ns, at the particular deterministic point in time associated with the relinquished token.

In step 750, master controller 310 determines whether to reissue the relinquished token back to the DMA controller 30. In one embodiment, master controller 310 may be configured to implement a priority scheme whereby shared memory 10 refreshes and requests from DMA controller 30E of system I/O controller 50 receive a higher priority than requests from DMA controllers 30 of processing elements 20. It is noted that master controller 310 may be configured to implement any type of priority scheme. Hence, master controller 310 may not reissue a relinquished token back to DMA controller 30 if at that future designated time, e.g., 128 ns, there exists a higher prioritized request, e.g., refresh shared memory 10, higher priority I/O request from DMA controller 30E of system I/O controller 50, to access shared memory 10 at that future designated time, e.g., 128 ns. Master controller 310 may instead issue the relinquished token to another DMA controller 30, e.g., DMA controller 30E of system I/O controller 50 for issuing a higher priority request, or withhold distribution for refreshing shared memory 10. For example, upon completion of the access to shared memory 10 by processing element 20, master controller 310 may not reissue the token back to DMA controller 30 of processing element 20 to grant the right to access shared memory 10 at a future designated time, e.g., 128 ns from the completion of the access to shared memory 10 by processing element 20, if DMA controller 30E of system I/O controller 50 requests access to shared memory 10 at that particular future designated time. Master controller 310 may then issue the relinquished token to the DMA controller 30E of system I/O controller 50 for issuing a higher priority request. In one embodiment, if master controller 310 did not reissue a relinquished token back to DMA controller 30, then master controller 310 upon completion of the designated period of time, e.g., 4 ns, at the future designated time, e.g., 128 ns, associated with the token not reissued may reissue that token back to DMA controller 30 where the token grants the associated processing element 20 or system I/O controller 50 the right to access shared memory 10 for a designated period of time, e.g., 4 ns, starting at a new future designated time, e.g., 128 ns from the completion of accessing shared memory 10 by the higher prioritized request.

Although the method and system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A system comprising:
    a plurality of processing elements, wherein each processing element of said plurality of processing elements comprises a direct memory access controller, and
    a shared memory coupled to said plurality of processing elements, wherein said shared memory comprises a master controller, wherein said master controller is operable for issuing tokens to direct memory access controllers for accessing said shared memory at deterministic points in time.

2. The system as recited in claim 1, wherein each of said tokens issued by said master controller grants access to said shared memory for a particular duration of time.

3. The system as recited in claim 1, wherein said shared memory comprises a plurality of banks of memory.

4. The system as recited in claim 3, wherein each of said direct memory access controller comprises a queue, wherein said queue stores a plurality of memory line addresses associated with said plurality of banks of memory in said shared memory.

5. The system as recited in claim 4, wherein each of said plurality of memory line addresses comprises a plurality of bits, wherein a portion of said plurality of bits in each of said plurality of memory line addresses indicates a particular bank of said plurality of banks of memory in said shared memory.

6. The system as recited in claim 5, wherein each of said direct memory access controllers comprises a detector configured to detect a bank conflict.

7. The system as recited in claim 6, wherein said bank conflict occurs when said portion of said plurality of bits in two or more of said plurality of memory line addresses in said queue of a particular direct memory access controller are the same.

8. The system as recited in claim 7, wherein if said bank conflict is detected by said detector of said particular direct memory access controller then said particular direct memory access controller inhibits more than one access request to a conflicted bank.

9. The system as recited in claim 1, wherein said master controller of said shared memory does not issue a token to access said shared memory at a particular deterministic point in time if at said particular deterministic point in time said shared memory is refreshed.

10. The system as recited in claim 1, wherein said master controller of said shared memory does not issue a token to access said shared memory to a first direct memory access controller at a particular deterministic point in time if at said particular deterministic point in time said master controller assigns a higher priority to a direct memory access request by a second direct memory access controller.

11. A method for accessing a shared memory in a deterministic schedule comprising the steps of:
    initializing a direct memory access controller in each of a plurality of processing elements with one or more tokens for accessing said shared memory at deterministic points in time;
    relinquishing a token to a master controller in said shared memory by a particular direct memory access controller of a particular processing element; and
    accessing said shared memory by said particular processing element in response to an access granted by said master controller, wherein said access is granted in response to said relinquishing step.

12. The method as recited in claim 11, wherein each of said one or more tokens in said direct memory access controller in each of said plurality of processing elements provides access to said shared memory at a different deterministic point in time.

13. The method as recited in claim 11 further comprises the step of:
    determining whether to reissue a relinquished token to said particular direct memory access controller of said particular processing element.

14. The method as recited in claim 13, wherein said master controller will not reissue said relinquished token to said particular direct memory access controller of said particular processing element if at a particular deterministic point in time associated with said relinquished token said shared memory is refreshed.

15. The method as recited in claim 13, wherein said master controller will not reissue said relinquished token to said particular direct memory access controller of said particular processing element if at a particular deterministic point in time associated with said relinquished token an input/output controller provides a direct memory access request assigned a higher priority to access said shared memory at said particular deterministic point in time associated with said relinquished token.

16. The method as recited in claim 13 further comprising the step of:
    issuing said relinquished token to said particular direct memory access controller of said particular processing element, wherein said relinquished token is stored in a first queue in said particular direct memory access controller.

17. The method as recited in claim 11, wherein said shared memory comprises a plurality of banks of memory, wherein the method further comprises the step of:
    determining whether there is a bank conflict.

18. The method as recited in claim 17, wherein each of said direct memory access controllers in each of said plurality of processing elements comprises a second queue configured to store a plurality of memory line addresses associated with said plurality of banks of memory in said shared memory, wherein each of said plurality of memory line addresses comprises a plurality of bits, wherein a portion of said plurality of bits in each of said plurality of memory line addresses indicates a particular bank of said plurality of banks of memory in said shared memory.

19. The method as recited in claim 18, wherein each of said direct memory access controllers in each of said plurality of processing elements comprises a detector to detect said bank conflict.

20. The method as recited in claim 19, wherein said bank conflict occurs when said portion of said plurality of bits in two or more of said plurality of memory line addresses in said second queue of a particular direct memory access controller are the same.

* * * * *